(12) United States Patent
Smuda et al.

(10) Patent No.: US 10,628,631 B1
(45) Date of Patent: Apr. 21, 2020

(54) DOCUMENT EDITING AND FEEDBACK

(71) Applicant: Amazon Technologies, Inc., Seattle, WA (US)

(72) Inventors: Jonathan Allen Smuda, Bothell, WA (US); Jenna Christine Leonardo, Seattle, WA (US); Sandra Keo, Seattle, WA (US); Preston Anthony Lord, Seattle, WA (US); Rajasekaran Nagarajan, Bellevue, WA (US); Jeffrey Alan Kirsch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 15/799,857

(22) Filed: Oct. 31, 2017

(51) Int. Cl.
| | | |
|---|---|---|
| *G06F 3/0483* | (2013.01) | |
| *G06K 9/00* | (2006.01) | |
| *G06K 9/72* | (2006.01) | |
| *H04L 29/06* | (2006.01) | |
| *G06F 40/169* | (2020.01) | |
| *G06F 40/14* | (2020.01) | |
| *G06F 40/106* | (2020.01) | |
| *G06F 40/109* | (2020.01) | |

(52) U.S. Cl.
CPC .......... *G06F 40/169* (2020.01); *G06F 3/0483* (2013.01); *G06F 40/106* (2020.01); *G06F 40/109* (2020.01); *G06F 40/14* (2020.01); *G06K 9/00456* (2013.01); *H04L 65/4015* (2013.01); *G06K 9/723* (2013.01); *G06K 2009/00489* (2013.01)

(58) Field of Classification Search
CPC .... G06F 17/241; G06F 17/212; G06F 17/214; G06F 17/2247; G06F 3/0483; G06K 9/00456; G06K 9/723; G06K 2009/00489; H04L 65/4015
See application file for complete search history.

(56) References Cited

U.S. PATENT DOCUMENTS

| | | | | |
|---|---|---|---|---|
| 9,413,739 | B1 * | 8/2016 | Rose | ...... H04L 63/08 |
| 9,715,482 | B1 * | 7/2017 | Bjorkegren | ...... G06F 17/24 |
| 9,817,805 | B1 * | 11/2017 | Markman | ...... G06F 17/241 |
| 2004/0201633 | A1 * | 10/2004 | Barsness | ...... G06F 16/34 |
| | | | | 715/864 |
| 2006/0048047 | A1 * | 3/2006 | Tao | ...... G06F 17/241 |
| | | | | 715/232 |
| 2006/0053364 | A1 * | 3/2006 | Hollander | ...... G06F 16/954 |
| | | | | 715/232 |
| 2010/0241711 | A1 * | 9/2010 | Ansari | ...... G06Q 30/04 |
| | | | | 709/205 |

(Continued)

OTHER PUBLICATIONS

Jack Schofield, "How Do I Zip and Unzip Documents?", published on Sep. 9, 2010 to www.bbc.co.uk/webwise/guides/unzipping-files, retrieved on Jun. 24, 2019 (Year: 2010).*

*Primary Examiner* — Shourjo Dasgupta
(74) *Attorney, Agent, or Firm* — Lee & Hayes, P.C.

(57) ABSTRACT

Techniques and systems for collaborative document editing and generating feedback on draft documents are described. A draft document is shared with multiple readers in a file format that is the same or similar to the file format in which the document will be published. The readers provide comments on the draft document. The comments can be stored in the same file as the document. Feedback may be solicited from a reader based on reading activity while interacting with the document.

20 Claims, 7 Drawing Sheets

(56) References Cited

U.S. PATENT DOCUMENTS

| | | | |
|---|---|---|---|
| 2011/0087955 A1* | 4/2011 | Ho | G06F 17/211 715/230 |
| 2011/0289401 A1* | 11/2011 | Fischer | G06F 17/211 715/232 |
| 2012/0030563 A1* | 2/2012 | Lemonik | G06F 17/248 715/255 |
| 2013/0042171 A1* | 2/2013 | Yang | G06F 16/4393 715/230 |
| 2013/0124967 A1* | 5/2013 | Hatfield | H04L 51/16 715/232 |
| 2013/0166391 A1* | 6/2013 | Blow | H04L 67/06 705/14.66 |
| 2014/0337126 A1* | 11/2014 | Ohanyan | G06Q 30/0251 705/14.49 |
| 2015/0178259 A1* | 6/2015 | Davis | G06F 17/241 715/230 |
| 2015/0248384 A1* | 9/2015 | Luo | G06Q 10/00 715/229 |
| 2015/0310188 A1* | 10/2015 | Ford | G06F 21/10 726/28 |
| 2016/0203109 A1* | 7/2016 | Ho | G06F 15/0291 715/246 |
| 2017/0286416 A1* | 10/2017 | Gan | G06F 3/0482 |
| 2018/0024976 A1* | 1/2018 | Joo | G06F 3/0488 715/230 |
| 2018/0123815 A1* | 5/2018 | Milvaney | G06F 17/2288 |
| 2018/0367626 A1* | 12/2018 | Azout | H04L 67/26 |

\* cited by examiner

DOCUMENT EDITING AND FEEDBACK

BACKGROUND

Tools for collaborative document editing can be cumbersome and difficult to use. When creating a document outside of a structured environment such as work or school it is often difficult to identify and connect with others who can provide meaningful comments. Even when quality comments are received, integrating the comments into the document may include copying and pasting or even retyping the comment creating the possibility of errors. Furthermore, tracking and keeping comments associated with a document may be difficult particularly if a user is working with multiple versions of the same document or several similar documents. Some systems for document editing provide for one-way communication in the form of the comments themselves but do not facilitate interaction between the person soliciting comments and the people providing comments.

Some types of comments regarding documents, such as comments related to layout, format, visual appearance, etc., may be specific to the type of device that is displaying the document. Thus, the comments of a reader may be specific to the type of device on which he or she is reading a document. Differences between the type of device used by an author or editor of the document and the types of devices used by others viewing the final document may confound attempts to create a polished, final version. Technical problems such as these and others may be addressed by advances in techniques and systems for document editing.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
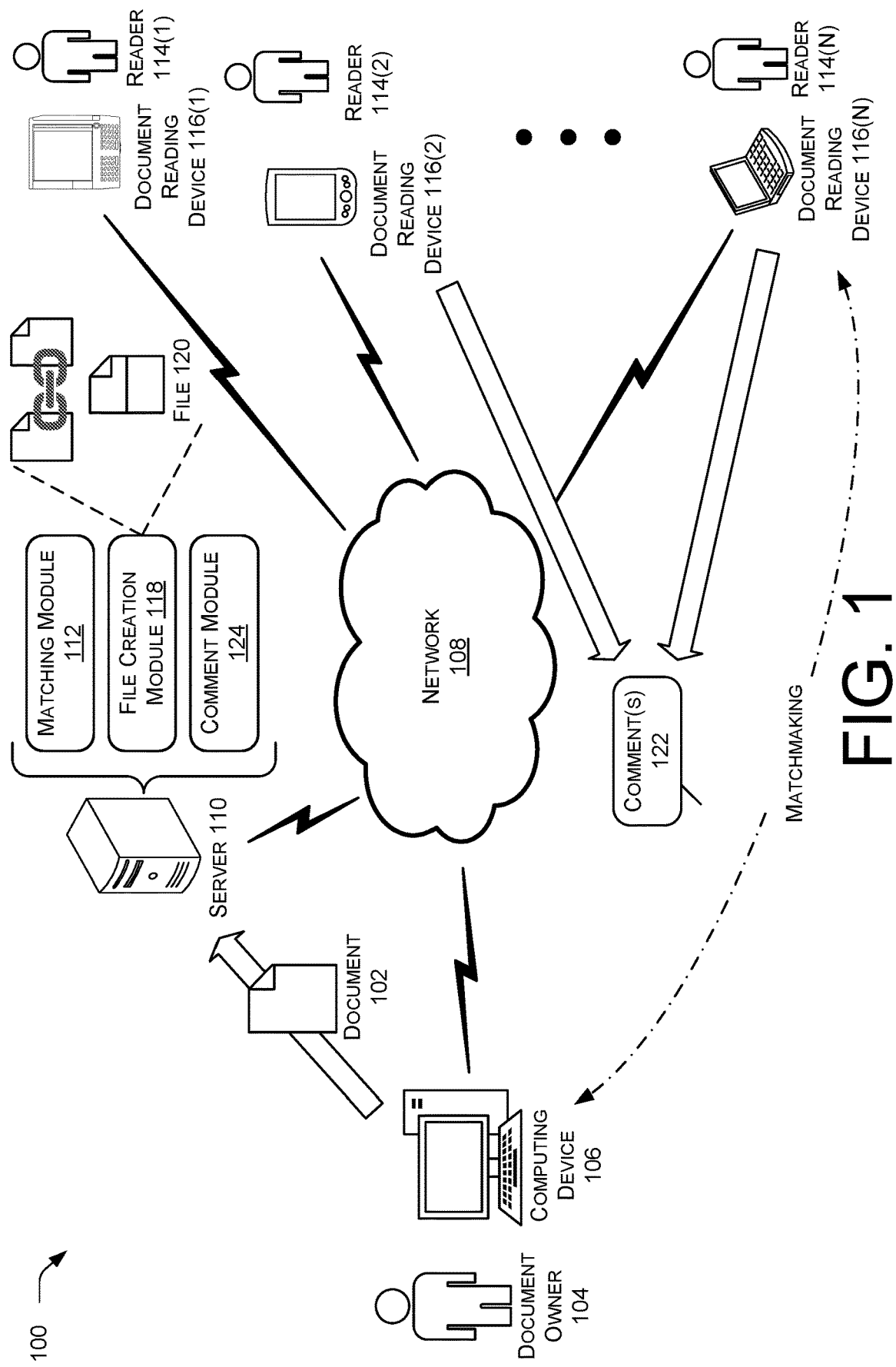
FIG. 1 is a schematic diagram of an illustrative environment for soliciting and receiving comments on a document.

This disclosure is directed to computer-based systems and techniques for improved, collaborative editing of documents. Potential readers for reviewing a document may be identified based on existing profiles of the individual reading preferences, qualifications, relationship with an author, and/or based on other factors. In some instances, the author of a document may select one, a few, or many different readers to receive a draft version of the document. The document itself may be contained within a special or proprietary file that also includes a metadata portion for recording multiple different comments from multiple different readers. Thus, the document and associated comments may be included in the same file which keeps the document and the comments together in one place and provides a mechanism for tying a comment to a specific location within the document. The comments may be placed in the file that contains the author's current draft of the document making it easy to apply the comments to the document itself.

The document can be provided to the readers in a format that is the same as the format in which the document will be published. Thus, the readers may be asked to review the document, and the document they will see is the document as it would appear to readers as a final, published version. This allows the readers to also comment on technical aspects of the document presentation that may be unique to a specific file format or hardware device that is used for reading the document. Certain types of comments that are readily actionable by the author (e.g., specific corrections rather than high-level feedback) may be agreed to by the author and then the change represented by the comment may be transferred to the document itself. Because the document is a digital document, it may be protected by digital rights management (DRM) that limits the amount of time that readers can access the document and may prevent the readers from further sharing the document with others.

Behavior of the readers while reviewing the document may be analyzed to provide additional insight into the comments themselves or to solicit comments from the readers. For example, a document reading device may track a reader's progress through the document and identify portions the document that the reader chooses to view multiple times (i.e., re-read). If a reader reads the document but has not posted any comments recently, the system may prompt the reader to generate a comment. If a reader re-reads a portion of the document, the system may generate a query asking the reader why he or she re-read this portion of the document. The commenting behavior of a reader may be associated with an individual profile of that reader and used to generate a "reputation" as a reviewer.

Reader comments provided through this system can be presented to the author of the document in multiple different ways. The comments may be sorted or filtered based on the reader that created the comment, the location in the document to which the comments apply, or by other aspects. Reader comments may also be analyzed in aggregate and insights from the aggregate feedback may be presented to the author. For example, portions of the document that receive a relatively high number or relatively low number of comments may be identified for the author. The author may choose to ignore, act on, or reply to a comment.

The feedback and commenting process may also be extended to documents after publication. For example, demographics of consumers that choose to purchase or read a document may be used to suggest potential readers for a draft of a similar document. Reading behavior of readers interacting with the final, published version of a document may identify portions that are frequently read, infrequently read, read quickly, read slowly, re-read, etc. This information may be presented to the author of the document for use in creating a revised version of the document or as insight into reader behavior for use when creating a new document. Additionally, comments provided on a published document may identify errors in the document that can be corrected in a subsequent or revised publication.

In one implementation, the document may be a manuscript for a fiction or nonfiction story. The author may wish to publish the document electronically as an electronic book (e-book) in one or more established e-book formats. Readers of e-books generally have accounts associated with purchasing or renting e-books and readers with such accounts may be offered an opportunity to opt into a service that allows them to act as a beta-readers for draft manuscripts. The beta-readers would have access to new books prior to publication but be expected to provide comments and feedback. The readers could be categorized by interest, reading patterns, and qualifications in a way that allows an author to select individual readers or groups of readers based on characteristics in the readers' respective user profiles. The author can also rate the feedback provided by readers which can become another part of the user profiles that may help other authors identify individuals who provide valuable feedback. Creating this two-way communication flow between an author and readers of a document can give significant advantages and pre-publication insight to authors that develop a document using this system.

The manuscript on which an author is currently working on can be sent in a preview mode to multiple readers for viewing and commenting on their e-book reading devices. The preview mode may display the manuscript in the same way as a published e-book but provide the ability to associate comments or make corrections to the document. Access to the manuscript may be time-limited to both incentivize the readers to provide timely comments and to restrict pre-publication access to the manuscript. The system for sharing the pre-publication document allows the readers to access the manuscript on their own e-book reading devices and interact with it in a manner similar to a conventional, published e-book. Comments and corrections may be made from the e-book reader devices which are captured and then sent back to the author and presented at the proper location within the manuscript. A system managing this interaction may aggregate the feedback by section of the manuscript, or in other ways, to provide author visibility into sections of the manuscript that have the most comments.

Continuing with the e-book implementation, post-publication data related to e-books such as sales data and social data may be collected and presented to an author to assist with authoring another e-book such as a sequel or second e-book on a similar topic. This information may include most read and least read pages. Demographics of readers and sales data may help an author determine who is reading his or her previously published works and which type of readers the author may wish to select as beta readers for a draft manuscript.

The previous example related to e-books is but one non-limiting implementation of the underlying technology for collaborative and distributed document editing. Although discussed in the context of e-books and text documents, this technology may be used for any type of document such as, for example, sheet music, architectural diagrams, computer code, etc.

FIG. 1 is a schematic diagram of an illustrative environment 100 for soliciting and receiving comments on a document 102. This environment 100 includes document owner 104 and a computing device 106 with which the document owner 104 interacts. The computing device 106 may be any type of computing device such as a desktop computer, laptop computer, tablet computer, e-book reader device, or the like. In many implementations, the document owner 104 is an author who generates the document 102 and reviews comments on this computing device 106. However, document owner 104 may be an individual other than the author such as a publisher, an editor, a supervisor, a collaborator, or any other individual that has appropriate access rights and privileges in the system to control review and revision of the document 102. The computing device 106 is connected at least intermittently to a network 108. The network 108 represents any type of communications network such as the Internet, a wide area network (WAN), a local area network (LAN), a telephone network, a cable network, a mesh network, a peer-to-peer network, and the like. The computing device 106 may send the document 102 across the network 108 to a server 110.

The server 110 may facilitate implementation of the system and coordinate dissemination of the document 102 and collection of comments. The server 110 is also a computing device that may be implemented as a single device, a cluster of servers, a distributed functionality spread throughout the "cloud" across multiple separate pieces of hardware, or even a desktop or portable computing device that may not be conventional identified as a "server." For example, in some implementations functionality of the server 110 may be contained in whole or in part in the computing device 106 used by the document owner 104. The server 110 may include a matching module 112 that identifies one or more readers 114(1), 114(2), . . . , 114(N) to review the document 102. The readers 114(1), 114(2), . . . , 114(N) may each interact with a respective document reading device 116(1), 116(2), . . . , 116(N) that can be implemented as a dedicated e-book reading device, a mobile phone, a tablet computer, a notebook computer, a desktop computer, and the like.

The server 110 may include a file creation module 118 that creates file 120 which includes the document 102 and comments 122 generated on the document reading devices 116(1), 116(2), . . . , 116(N). In one implementation, the file 120 be two separate files that are associated with each other. For example, a first file containing the comments 122 may be linked to a second file containing the document 102 or associated in other ways, such as by placement in a same folder or compressed package, etc. Thus, in some implementations the file 120 may represent two, or more, discrete yet associated files. The document 102 and the comments 122 may be placed in separate portions of the file 120. Thus, the file 120 may have a file structure that contains two or more different portions: one for the document 102 and one for comments 122 as well as potentially other content. The comments 122 may be received and processed by a comment module 124 on the server 110.

In some implementations, the interaction between the document reading devices 116 and the computing device 106 of the document owner 104 may be mediated by the server 110 such that data traveling between a document reading device 116 and the computing device 106 first travels through the network 108 to the server 110 before later been sent from the server 110 to the computing device 106. Alternatively, a direct connection or peer-to-peer connection may be established between a document reading device 116 and the computing device 106. This direct connection may pass through the network 108 without being mediated or received by the server 110.

One aspect of the environment 100 is the identity of the readers 114. The readers may be selected by the document owner 104 through a matching process. Each reader 114 may be given the opportunity to opt into this system in which case that reader 114, after opting in, would then be available for the document owner 104 to select as a recipient of a draft document 102. In some implementations, the document owner 104 may select an individual who is a friend, a colleague, or a person who has reviewed previous documents written by the document owner 104. In some implementations, the document owner 104 may select the readers 114 based on characteristics of the readers 114. For example, the document owner 104 may select readers 114 based on information stored in a user profile such as hobbies, interests, reading preferences, reading patterns, qualifications, ratings of the reader 114 by other authors, age, geographic location, demographic information, etc. A rating of a reader 114 may be calculated from document owner 104 responses to past comments made by that reader 114 on one or more other documents. Some information in a user profile may be self-generated such as interests, reading preferences, hobbies, profession, and the like. Other information may be derived based on behavior of the reader 114 such as types of documents that the reader 114 reads, reading speed, Internet protocol (IP) address, model of document reading device 116, etc. Characteristics of a reader 114 may be stored in a user profile, user account, etc.

In many implementations, matching between the document owner 104 and the readers 114 may be document owner 104 driven and the readers 114 may be given the choice to receive a draft version of a document 102 or decline. However, in some implementations the readers 114 may be able to search for documents to review. The document owner 104 may classify a document 102 with tags or descriptors that the readers 114 can use to search for the document 102. The document 102 may also be identified by length, word count, language, etc. Readers 114 may use any of these characteristics to search and filter collections of documents to identify one or more documents to review. Pre-existing connections between a document owner 104 and a reader 114 such as an association through a social network, an email address book, shared membership in a group, etc. may be used to match the document owner 104 with the reader 114.

Figure 2:
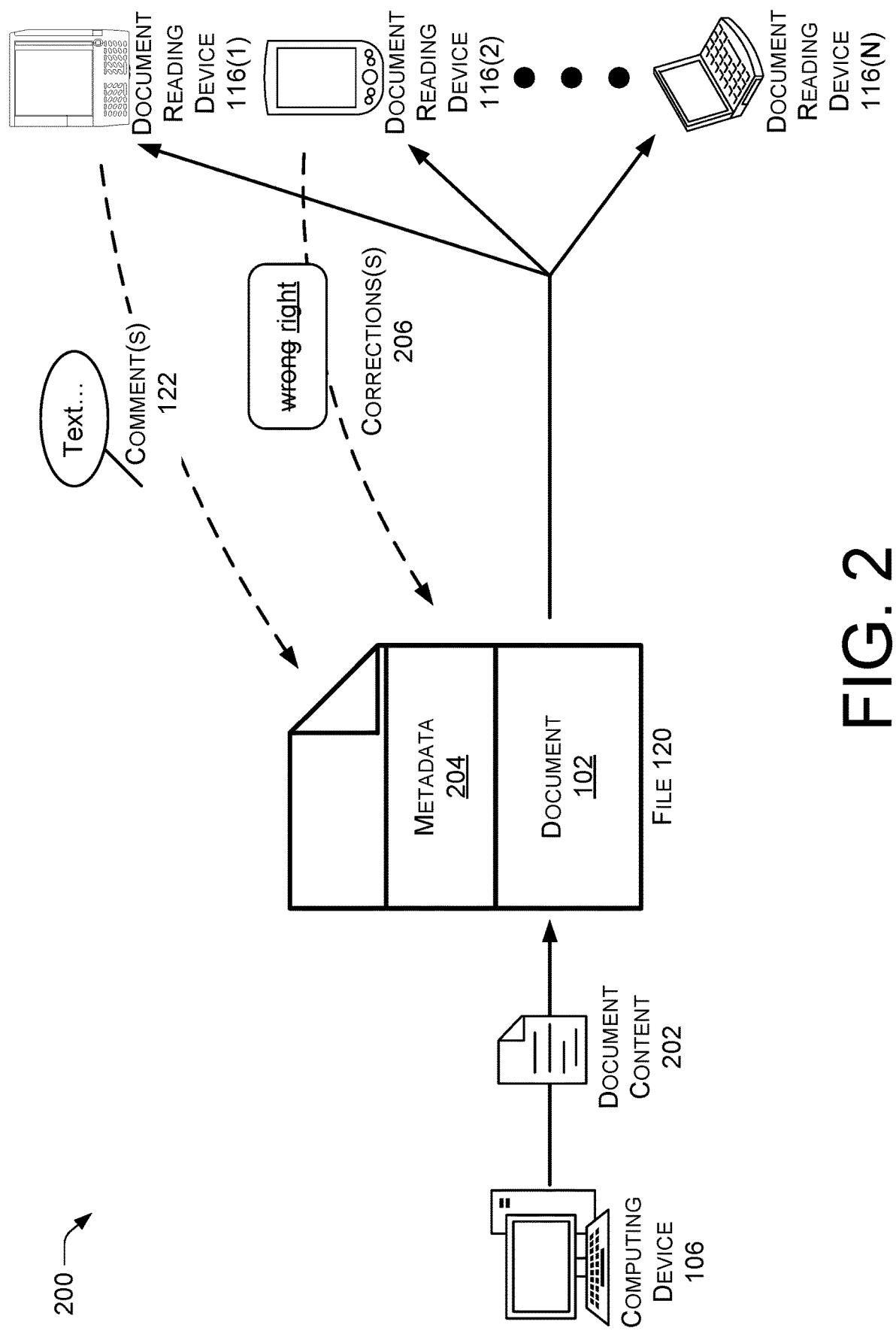
FIG. 2 is a schematic diagram of a file containing a document and comments and/or corrections and associated devices.

FIG. 2 shows a schematic diagram 200 of interactions between the computing device 106 and the document reading devices 116(1), 116(2), . . . , 116(N) with respect to a file 120 containing a document 102. The document 102 includes document content 202 created by the document owner 104. The document 102 is an electronic file or portion of an electronic file that contains the document content 202. Thus, the document content 202 may be "raw" data without a specific file format such as text, or other content, generated by the document owner 104 on the computing device 106. In one implementation, the document content 202 may be in a first file format that is a conventional or standard such as a text file, a portable document 102 format (PDF) file, or hypertext markup language (HTML), and the like. However, the document content 202 may be packaged into a document 102 that is included a file 120 in a second file format such as a specialized or proprietary format. A format of the file 120 may include features specific to a type of document reading device 116, and that file format may be extensible markup language (XML), electronic publication (EPUB), iBook, Kindle file format, etc. Features of specialized document 102 formats for manuscripts may include typesetting and layout engine functionality that enables reflowing of text, hyphens, kerning, and/or ligatures. The file 120 additionally includes or is associated with one or more types of metadata 204 that contain additional data associated with the document 102. One type of metadata 204 that may be included are annotations. Annotations are created by a reader 114 interacting with an e-book on a document reading device 116 typically for personal use and not generally for sharing. Annotations may be thought of as similar to margin notes in a conventional paper book.

In some implementations, the format of file 120 may be the same as a final version of a document 102 that is published and made publicly available (e.g., both are EPUB files). Thus, the file 120 that is received by the document reading devices 116(1), 116(2), . . . , 116(N) will render and appear on the respective document reading devices 116 the same as a final, published version of the document 102. However, the file 120 that contains a document 102 that is in draft form; and the file 120 is able to receive and incorporate comments 122 and corrections 206 in the one or more metadata 204. In general, comments 122 include content such as text (drawings, diagrams, audio files, video files, etc. are also possible) generated on one of the document reading devices 116(1), 116(2), . . . , 116(N). The comments 122 and corrections 206 are intended for reading or viewing by the document owner 104. For example, comments 122 may include questions regarding the document content 202, high-level suggestions for modifications to the document content 202, comments regarding rendering of the document 102 on a specific type of document reading device 116, or the like. Corrections 206 are also intended for reading or viewing by the document owner 104, but include specific changes to the document content 202 that may be implemented or "accepted" as is without further input from the computing device 106. For example, corrections 206 may include corrections to spelling, grammar, punctuation, word choice, etc.

The comments 122 and the corrections 206 can be provided from the document reading devices 116(1), 116(2), . . . , 116(N) to the metadata 204 of the file 120. The metadata 204 may include content associated with the document 102 in addition to comments 122 and corrections 206. Content in the metadata 204 may provide additional information about the document 102 and/or it may be supplemental data that expands on information present in the document 102. In an implementation, there may be only a single category of metadata 204 that includes all information to be associated with the document 102. In a different implementation, there may be multiple types of metadata 204. Multiple types of metadata 204 may be separated based on type of content such as a first layer of metadata for comments 122 and a second layer of metadata for corrections 206. Multiple layers within the metadata 204 may be separated based on source of the content such as a first layer for content from a first document reading device 116(1) and a second layer for content from a second document reading device 116(2). There may be N different layers of metadata 204 if content is received from N different document reading devices.

The file 120 may also include DRM to prevent copying and/or to enforce temporally limited access to the document 102. Thus, a document reading device 116 that receives a copy of the file 120 may be unable to further copy or share the file 120. In some implementations, this limitation on copying may be applied only to the document 102 so that a document reading device 116 is prevented by the DRM from copying document 102 itself 204 but may make copies and share content included in one or more of the metadata 204. Preventing copying and dissemination of document content 202 may be important for a document owner 104 when sharing a manuscript prior to publication.

In one implementation, the file 120 may be sent to the document reading devices 116(1), 116(2), . . . , 116(N) with an empty metadata 204 portion. A copy of the file 120 is then created in local memory on each of the document reading devices 116(1), 116(2), . . . , 116(N). The respective document reading devices 116(1), 116(2), . . . , 116(N) provide comments 122 and/or corrections 206 that are added to the metadata 204. The comments 122 and corrections 206 may be provided to the computing device 106, and thus, to the document owner 104, in a number of different ways. The comments 122 and corrections 206 may initially be saved to the metadata 204 of the locally-stored copy of the file 120 on a document reading device 116. The locally-stored copy of the file 120 containing the comments 122 and/or corrections 206 (as well as the document 102) may then be sent from the document reading device 116 to the computing device 106 or to a cloud-based system such as the server 110. The comment module 124 introduced in FIG. 1 may combine the comments 122 received from multiple different document reading devices 116(1), 116(2), . . . , 116(N) into a metadata 204 portion of the file 120 that is made available to the computing device 106 either from its local memory or from the server 110.

At times, multiple readers may independently make the same or similar comment 122 or the same correction 206. In such instances, multiple comments 122 or corrections 206 may be combined so that only one comment 122 or correction is shown (or fewer are shown) instead of numerous comments 122 or corrections 206 that are the same or similar. In some implementations, all comments 122 and corrections 206 may be contained in the metadata 204, but only a representative one is initially included in a user interface. The owner of the document, or a reader, may see the additional comments 122 or corrections be activating an option to show more or show all.

In various implementations, comments 122 and corrections 206 that are the same or similar may be combined if they are associated with the same general location in the document 102 (i.e., the same comment 122 at the same location). Comments 122 or corrections 206 that are identical to other comments 122 or corrections 206 (e.g., contain at least some of the same words or characters in the comment 122/correction 206) can be readily identified and merged. Comments 122 or corrections 206 that are not identical may be identified as similar by known techniques for comparing text such as stemming of words, normalization, identification of synonyms, lexical analysis, semantic analysis, and the like.

In a different implementation, after receiving a copy of the file 120 containing the document 102, document reading devices 116(1), 116(2), . . . , 116(N) return only the comments 122 and/or corrections 206 and do not send back a copy of the document 102. This may be implemented by sending only the metadata 204 of the locally-stored copy of the file 120. This reduces the volume of data that is transmitted back from the document reading devices 116(1), 116(2), . . . , 116(N) to either the computing device 106 or the server 110. If there are a large number of users reviewing the document 102 (e.g., N is 100, 500, 1000, or more) The volume of data represented by transmitting the document 102 back to the computing device 106 or server 110 may be significant. Even if there are a small number of readers 114 reviewing the document 102, a large document 102 containing many pages of text or other elements such as pictures, sounds, videos etc. may have a relatively large file size. Furthermore, the one or more of the document reading devices 116(1), 116(2), . . . , 116(N) may be devices that have limited upload bandwidth such as dedicated e-book reading devices. Thus, returning only the comments 122 and corrections 206 without sending back the document 102 itself can improve performance of the document reading devices 116(1), 116(2), . . . , 116(N) because the devices are not required to handle a large upload. In any implementation, the comments 122 and corrections 206 may be encrypted before sending.

In another implementation, the computing device 106 may send the document content 202 to the server 110, where the server 110 packages it into the file 120 and makes the file 120 available on the server 110 to the document reading devices the document reading devices 116(1), 116(2), . . . , 116(N) without sending the entire file 120 to any of the document reading devices the document reading devices 116(1), 116(2), . . . , 116(N). This may be accomplished by streaming portions of the document 102 or providing a next page of the document 102 upon receiving a page turn request from a document reading device 116. With the file 120 stored on the server 110, the comments 122 and corrections 206 received by the server 110 may be integrated into the metadata 204 of the file 120. The file 120 as modified by additional content added to the metadata 204, may be returned to the computing device 106 for storage in local memory or made available to the computing device 106 from the server 110. Additionally, to reduce the amount of data transferred between the server 110 and the computing device 106, only the metadata 204 of the file 120 may be sent from the server 110 to the computing device 106 where a copy of the file 120 in the local memory of the computing device 106 may be updated with the new metadata 204 without changing the document 102.

Figure 3:
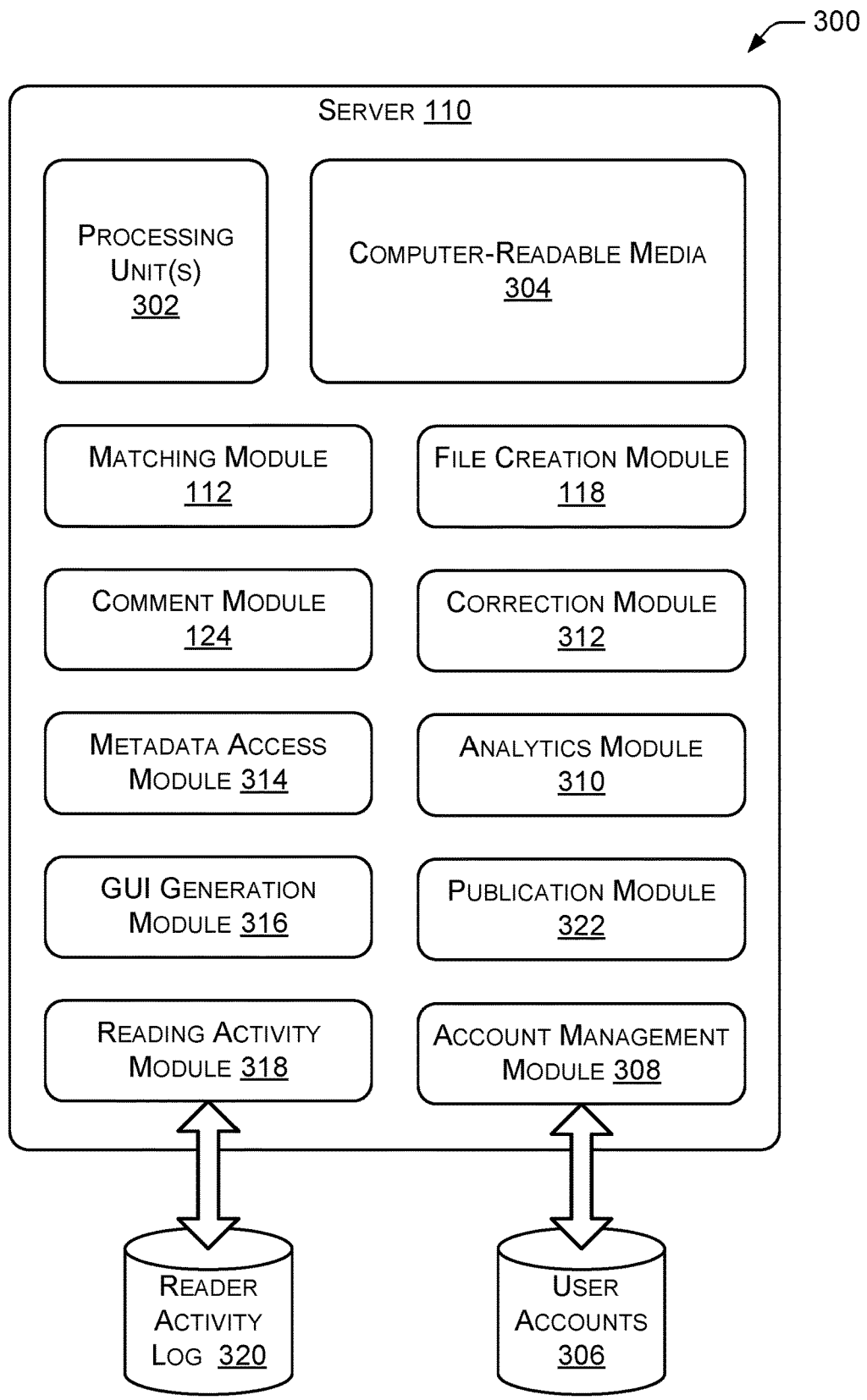
FIG. 3 is a schematic diagram of server that can facilitate commenting on a document.

FIG. 3 shows a schematic block diagram 300 of components that may be present in the server 110. Although shown in the diagram 300 together in a single grouping, it is to be understood that the various components of the server 110 may be distributed across multiple pieces of hardware and multiple physical locations. Also, although referred to as a "server" for ease of differentiation, any or all of the components shown in the diagram 300 may be included in the computing device 106 and/or one or more of the document reading devices the document reading devices 116(1), 116(2), . . . , 116(N).

The server 110 comprise one or more processing units 302 and computer-readable media 304. Individual ones of the processing units may be implemented as hardware processing units (e.g., a microprocessor chip) or software processing units (e.g., a virtual machine). The hardware processing units may be implemented in any suitable type of processor such as a single-core processor, a multicore processor, a central processing unit (CPU), a graphical processing unit (GPU), or the like. The computer-readable media 304 may be implemented in hardware or firmware. The computer-readable media 304 may include, but is not limited to, random access memory (RAM), read only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other tangible medium which can be used to store information and which can be accessed by a processing unit. Computer-readable media 304 encompasses non-transitory computer-readable media. Non-transitory computer-readable media includes all types of computer-readable media other than transitory signals which are specifically excluded. The server 110 also contains multiple modules. The modules may be implemented as software stored in the computer-readable media 304 (or elsewhere), firmware, hardware, a system-on-a-chip (SOC), mechanical computing devices, etc. The server 110 may include additional modules beyond those discussed below and any of the modules may be omitted or combined.

The modules implemented as software may include instructions that, when executed by the processing units 302, cause the processing units 302 to perform the operations associated with a respective module.

Collaborative editing of documents may begin with forming an association between the document owner 104 of the document 102 and the other people who will edit the document 102. This can be performed by the matching module 112. Matches may be made by a document owner 104 identifying readers to review a draft document 102. Alternatively, a document owner 104 may put out a draft document 102 and readers may find that draft document 102 by searching for a document 102 to review.

If a document owner 104 knows specific individuals that he or she would like to review a document 102, the document owner 104 may specifically identify those individuals by a unique identifier such as name, username, email address, etc. In an implementation, this unique identifier may be associated with a user account 306. A user account 306 may include information such as a user's interests, reading preferences, reading patterns, qualifications, etc. Each user account 306 may be associated with one or more tags that provides a summary of information about that user account 306 in a standard format. For example, any user that reviews documents more than once per week, may have a tag added to his or her user account 306 that identifies that user as a "frequent reviewer." Similarly, users that finish more than one science-fiction content item each month may be associated with a tag for "sci-fi fan." Thus, tags allow users with similar but not identical behavior to be identified with the same tag enabling efficient and simple computer-based sorting and separation of user accounts 306 based on the tags.

The user accounts 306 may be managed by an account management module 308. The account management module 308 may add information to a user account 306 received from the user associated with the account, received from another user (e.g., a document owner 104), or generated by a computing system based on behavior of the user. The account management module 308 can implement opt in choices of users who choose to be available to receive and review draft documents. Users that choose to be discoverable by document owners 104 searching for readers may be contacted by a document owner 104 and asked to review a draft document 102. Users that do not opt in will not be contacted.

The matching module 112 may receive a list of tags from a document owner 104 and then search through the user account 306 to identify accounts that are also associated with the list of tags. Thus, a document owner 104 can precisely specify which types of users he or she wishes to receive a draft copy of a document 102.

If a reader 114 is searching for a document 102 to review, the matching module 112 may receive information from the reader 114 identifying characteristics of a document 102 and then search for documents provided by document owners that match those characteristics. A document 102 may be associated with one or more tags provided by the document owner 104. The tags may describe state of completion of the draft (e.g., outline, rough draft, two-thirds finished, completed final draft, etc.). The tags may also describe a genre, style, or type of content included in the document 102. The document owner 104 may also specify a maximum length of time that a reader 114 can access the document 102 (e.g., the document 102 must be reviewed within 30 days). Thus, any reader 114 that begins reviewing this document 102 would have a limited time to finish the review before DRM prevented continued access to the document 102. The document owner 104 may also specify a deadline that applies to all reviewers (e.g., comments on chapter 1 are due by May 1). These time limitations may be used by a reviewer to identify documents that have review needs compatible with his or her schedule. The account management module 308 may access information from other systems such as, for example, social networks, to obtain additional information about users and include this information in the user accounts 306. This additional information may be used by a document owner 104 to search for readers for a draft document 102.

The file creation module 118 creates a file 120 that contains the document 102. The file creation module 118 combines document content 202 received from a document owner 104 and comments 122 and/or corrections 206 received from readers. The file 120 includes a document 102 portion that contains the document content 202 and a metadata 204 portion that includes the comments 122 and corrections 206. The file creation module 118 may create the file 120 in one or more different formats. For example, the file creation module 118 can create different versions of the file 120 having identical content but different file formats. This may allow dissemination of the file 120 to a larger number of different types of document reading devices 116. The file creation module 118 may also apply DRM to the file before it is shared.

The comment module 124 receives comments 122 and associates those with the metadata 204 portion of a file 120. The comments 122 may include an invariant reference to a portion of the document 102. The invariant location reference identifier is a unique identifier that corresponds to a specific location or segment of content in the document 102, which is not affected by changes in screen size, font type or size, resolution, or other display conditions. Thus, the invariant location reference identifier provides a reference to the assigned text regardless of display conditions of the document reading device 116. An invariant reference may be used instead of, for example a conventional page number, because the document 102 may have different pagination depending on the document reading device 116 and settings with which it is viewed. Also, a length and arrangement of portions of the document 102 may change with editing so that an invariant reference accurately associates the comments 122 with the same content following such changes. The comment module 124 may organize the comments based on identity of reviewers, creation date, length, location in the document 102, or tags associated with the comment. The tags may include indicators of the type of comment 122 (e.g., plot, grammar, tone, character, user interface, etc.) and may be created by the reviewer as part of generating a comment. Alternatively, the tags associated with a comment 122 may be generated by the comment module 124 such as by analysis of the comment 122 (e.g., semantic analysis, sentiment analysis, natural language processing, etc.).

The comment module 124 may determine if two comments, either from the same or different document reading devices 116, have the same or similar content. In one implementation, the evaluation of similarity may be performed on comments 122 that have the same invariant reference. Two comments 122 that do not contain identical text may be analyzed by language understanding algorithms (e.g., natural language understanding algorithms, etc.) or other know techniques for determining similarity between natural language text. Thus, the comment module 124 may create one aggregate comment 122 from multiple individual comments 122 that are the same or similar to each other.

A correction module 312 receives the corrections 206 from the readers. Like comments 122, the corrections 206 may be associated with invariant reference in the document 102. Thus, correction 206 will be associated with the right word (or other part of the document 102 like a drawing element) across different devices and even as the document 102 changes. The correction module 312 may implement one or more corrections 206 by making a change to the document 102 in the file 120. Thus, when the correction module 312 receives indication that a correction 206 is authorized or accepted, then the correction module 312 can modify the document 102 within the file 120. After making the modification, the correction 206 may be deleted from the metadata 204 of the file 120 or the correction 206 may remain in the metadata 204 with an indicator that the correction 206 has been implemented. The indication to implement a correction 206 may come from the computing device 106, the document owner 104 using a different device, or the correction module 312 without direct user input. The document owner 104 may select which types of corrections 206 or which readers 114 are able to make corrections 206 that are implemented without specifically being acknowledged or accepted. For example, all corrections 206 that are tagged as spelling corrections may be implemented without input from the document owner 104. As a further example, all corrections 206 from a specific reader 114 (e.g., a trusted editor) may be implemented by the correction module 312 without input from the document owner 104.

The correction module 312 may determine if two corrections, either from the same or different document reading devices 116, are the same or similar correction. In one implementation, the evaluation of similarity may be performed on corrections 206 that have the same invariant reference. Two corrections 206 that do not contain identical text may be analyzed by artificial intelligence or other know technique for determining similarity between natural language text. For example, a correction 206 that adds a period followed by a single space and a different correction 206, at the same invariant reference, that adds a period followed by two spaces may be identified as similar corrections 206. Thus, the correction module 312 may create one aggregate correction 206 from multiple individual corrections 206 that are the same or similar to each other.

Both the comment module 124 and the correction module 312 may make comments 122 and corrections 206 respectively available to readers 114(1), 114(2), . . . , 114(N) other than the reader 114 who generated the comment 122 or correction 206. Thus, in an implementation, readers 114 may be able to view the comments 122 and corrections 206 provided by other readers 114. This feature may be enabled or inactivated by settings provided to the metadata access module 314 described below. A reader 114 may be able to create meta-comments on the comments 122 or corrections 206 of other readers 114. This creates a communication channel between the readers 114. The format for the meta-comments could be open thus allowing readers 114 to create additional text, audio, video etc. that responds to a comment 122. Alternatively, the types of meta-comments could be restricted to selection from a limited number of choices such as indicating agreement or disagreement with a comment 122 and ranking a comment 122 (e.g. 0 to 5 stars).

The metadata access module 314 provides access to the metadata 204 and document 102 portions of the file 120. In general, the ability to modify the document 102 within the file 120 is limited to the computing device 106 that provided the document content 202. However, the document owner 104 may use an account to identify himself or herself and obtain access to the document 102 portion of the file 120 from a different computing device. There may also be some instances, such as when the correction module 312 makes corrections without user input, when the metadata access module 314 permits other devices to modify the document 102 portion of the file 120. If the metadata 204 contains multiple separate layers of metadata and the separate layers are each associated with a different reader 114(1), 112(2), . . . , 112(N), then the metadata access module 314 may allow a reader 114 to make modifications to the metadata 204 that contains his or her comments 122 and corrections 206 but prohibit modifications to a metadata 204 that is associated with a different reader 114. The metadata access module 314 may, however, allow a reader 114 to view the comments 122 and corrections 206 created by other readers 114. Thus, for example, the reader 114 could delete or change his or her comments 122 after posting but could not alter the comments of others.

Due to the file format in which the file 120 includes both the document 102 and the metadata 204, making changes even to the metadata 204 portion of this file 120 may involve altering a file that exists on the local storage of the computing device 106. Thus, the metadata access module 314 controls the way in which document reading devices 116 can insert comments 122 and/or corrections 206 into the file 120.

An analytics module 310 provides information and insight about the comments 122 and corrections 206 in aggregate. For example, the analytics module 310 may provide sorting of comments 122 by identity of the reader 114, by a rating of the reader 114, or by tags or other metadata associated with individual comments. The invariant references associated with the comments 122 and corrections 206 may be used to group by section of the document 102. For example, in a book the comments 122 could be grouped by chapter. The analytics module 310 may also create a heat map of the document 102 showing locations where there are frequent comments 122 and/or corrections 206. The heat map could be a visual rendition representing the entire length of the document 102 or it could be a tabular representation showing numbers of comments 122 and/or corrections 206 in different sections of the document 102. Other formats for the heat map are also possible. The heat map provided by the analytics module 310 may provide a document owner 104 insight into which portions of the document 102 attract the most comments 122 and/or the most corrections 206. If there are sections of the document 102 that have a low number of comments 122 (e.g. zero comments, less than a threshold number, less than an average number as compared to other sections, etc.) those portions of the document 102 can be identified by the analytics module 310 and the server 110 may send a communication to one or more of the document reading devices 116 requesting additional comments 122 for these portions of the document 102.

During revision and editing of the document 102, the document owner 104 may identify two divergent options for modifying the draft document 102. These options may be identified in response to comments 122 or another way. The document owner 104 may create two, or more, different versions of the document 102. The reader pool may be split between the different versions or additional readers 114 may be recruited. Comments received on the versions of the document 102 may allow the document owner 104 to identify which version of the documents receives the most comments with positive sentiment. This may allow the document owner 104 to select between multiple options for a document 102 and ultimately publish the version that receives them most positive (most negative would also be possible) sentiment from readers 114.

The analytics module 310 may also identify the type of document reading device 116 associated with a comment 122 or correction 206 to determine if there is any correlation between specific types of feedback and the type of device on which a reader 114 is viewing the file 120. This may identify, for example, formatting issues that are present only on certain types of document reading devices 116. These types of device-specific problems may not be apparent to the document owner 104 or other readers 114 that use different devices. Distributing the document 102 in the same file format as the document 102 will be published allows for identification of these types of issues before actual publication.

A GUI generation module 316 can create graphical user interface (GUI) representations of the content in the metadata 204 of the file 120 such as a list of comments 122, a heat map showing locations of corrections 206, and the like. The GUI generation module 316 if located on the server 110 may provide content or instructions for GUI generation on the computing device 106.

A reading activity module 318, tracks reading activity of the readers 114 while interacting with the document 102 either before or after publication. The reading activity module 318 may be implemented on a document reading device 116 and send the reading activity data to the server 110. Alternatively, the reading activity module 318 may be located on the server 110 and receive data describing interactions with the document 102 on the document reading device 116.

The reading activity module 318 can track how far through the document 102 a reader 114 has read, the pace with which a reader 114 reads both in terms of how fast the reader 114 advances through the document 102 when reading (e.g., page turn speed) and how much of the document 102 the reader 114 finished in a given time period (e.g., pages read per day or per week), and portions of the document 102 that the reader 114 has read more than once (e.g., re-read pages or sections). Behavior of a reader 114 while reading the document 102 may be recorded in a reader activity log 320. Information in the reader activity log 320 may include information derived from behavior of a reader 114 interacting with multiple different documents. For example, a reader's reading speed may be determined not only by reading activity associated with a given document 102 but also with reading activity observed when interacting with other documents.

Reading activity may also include commenting activity. Thus, the reading activity module 318 may additionally detect when and what portions of the document 102 a reader 114 makes comments 122 and or corrections 206. This information may be included in the reader activity log 320. Thus, by analyzing information obtained by the reading activity module 318. it is possible to determine how frequently a given reader 114 provides comments 122 or corrections 206. Readers 114 who receive draft documents and only read without providing feedback may be identified in this way. Similarly, readers 114 who start reading a document 102 and provide multiple comments but fail to finish reading or fail to make comments or corrections towards the end of the document 102 may be identified. This information and types of behaviors derived from the reader activity log 320 may be associated with a profile of the reader 114 such as a profile stored in the user accounts 306. Thus, a reader 114 may develop a reputation or rating based on behavior detected by the reading activity module 318 without any direct input from the document owner 104 or other user.

The reading activity module 318 may also identify reading activity that can be the basis for contacting the reader 114. The server 110 may send a communication to a document reading device 116 in response to the reading activity module 318 detecting a specific type of reading activity. The communication may be a solicitation for a comment 122 or a correction 206. The communication may also be a query to the reader 114. The solicitation for comment 122 may be generated if the reader 114 has reached a milestone in the document 102 without providing a comment 122. For example, the milestone may be a certain amount of content read, if this exceeds a threshold amount without a comment (e.g., 10 page turns), then the server 110 may ask the reader 114 to provide a comment 122. The milestone could be a certain amount of time elapsed without a page turn (e.g., the reader 114 has not advanced through the document 102 in three days). The milestone may also be a specific portion of the document 102 such as the end of a chapter. Thus, if a reader 114 completes an entire chapter of the document 102 without making any comments 122 or making less than a threshold number of comments 122, the server 110 may generate a communication asking for a comment 122.

Changes in reading activity such as an increase or decrease in reading speed may cause the server 110 to send a query to the document reading device 116 asking the reader 114 if there is a reason for the change. Similarly, reading a section of the document 102 more than once may cause a reading activity module 318 to cause the server 110 to send a query asking why the reader 114 re-read that portion of the document 102. Responses from the reader 114 to these queries may be handled as comments 122. Alternatively, the responses to these types of queries related to reading activity may be placed in a separate layer of the metadata 204 section. Thus, the document owner 104 may choose to view, or not, the layer in the metadata 204 that contains the responses to queries related to reading activity.

After receiving feedback from the readers 114 and editing the document 102, the document owner 104 may publish a final version of the document 102. The document 102 as published may incorporate some of the comments 122 and corrections 206 provided on the draft version of the document 102. The published document may be published in a file that is the same format as the file 120 used to disseminate the document 102 for commenting. Thus, the document owner 104 may have already received feedback on the document 102 as it is rendered on multiple different types of document reading devices 116, thus identifying issues that may be unique to digital documents viewed on multiple different devices. However, unlike the draft document 102, the file that is published may lack the metadata 204. Thus, the published document may be handled identically by the document reading devices 116 but lack a structure in the file 120 to incorporate feedback.

Publishing results in copies of the document 102 reaching users other than the readers 114 selected to review the document 102. Publication may place a copy of a file containing the document 102 in computer-readable media where it is available to be purchased, rented, or borrowed. This may be a public publication in which any user can obtain a copy of the document 102 or it may be a more limited publication that makes the document 102 available only to users within a designated group such as company, school, etc.

Following publication, information may be collected about the published document. One type of information includes sales and sentiment data generated from sales, rentals, and/or lending) of the document 102 and sentiment data regarding the document 102 such as reviews and comments posted to a website or otherwise shared. Demographics of the buyers of the document 102 may be collected. This information may be used to understand which types of people are choosing to read this document 102. The sentiment data may provide information to the document owner 104 that can be used for writing a revised version of the document 102 or a different document such as a subsequent novel in a series. Other information collected may be based on reading activity of those who read a published version of the document 102. The reading activity module 318 may capture reading activity of users who interact with the published version of the document 102. This reading activity may identify most read and least read portions of the document 102. It may also identify how quickly readers of the published document progress through the document. This analysis may indicate portions of the document 102 that are of greater or lesser interest as well as portions that are easier or more difficult to understand. For example, in a technical document 102 a portion of the published document that is re-read frequently may indicate that it is unclear or that greater effort should be spent expanding that section of the document 102 a future version.

Information about the document 102 collected post-publication may be used to correct grammatical errors, typographical errors, formatting issues, and the like. This information may be collected as part of the sentiment data or through feedback provided by email, webpage comments, etc. The published document is an electronic document and may be revised frequently and republished to correct errors or problems in an earlier version.

Comments received from the readers 114 that reviewed the document 102 prior to publication may be used in conjunction with the respective characteristics of the readers 114 stored in the user accounts 306 to target marketing of the published document. Characteristics of readers 114 that provided positive comments regarding the draft document 102 may be used to identify a demographic that would likely enjoy the published document. Similarly, if there are shared characteristics of the readers 114 that provided negative comments regarding the draft document 102, then marking activity for the published document could be modified to avoid users with those characteristics. Portions of the draft document 102 that were read frequently and/or received multiple positive comments may be selected for use as excerpts for marketing the published document.

Figure 4:
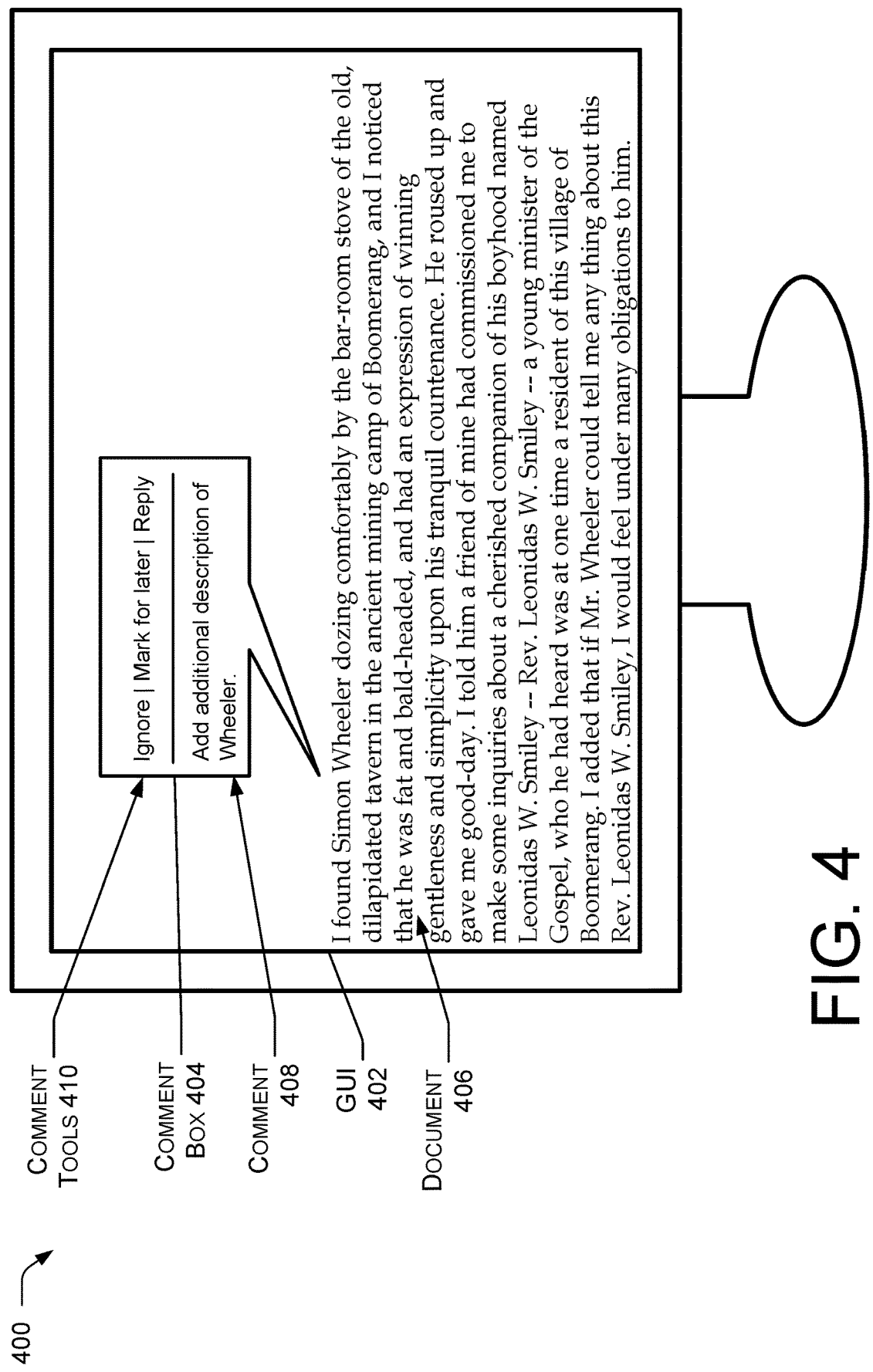
FIG. 4 is an illustrative graphical user interface (GUI) illustrating a comment associated with a document.

FIG. 4 shows a display device 400 displaying a GUI 402 on a which a comment box 404 is overlaid on a displayed portion of a document 406. The display device 400 may be part of the computing device 106 used by the document owner 104. The display device 400 may alternatively be part of a different device such as a mobile phone or e-book reading device. The document owner 104 may review and respond to comments on a different device than the one on which he or she authored the document 406. The GUI 402, or data that is included in the GUI 402, may be generated by the GUI generation module 316. In an implementation, the comment box 404 includes a comment 408 and comment tools 410. The comment box 404 may alternatively contain only the comment 408 or the comment box 404 may contain additional or different comment tools 410 than those illustrated in FIG. 4.

A comment 408 that is associated with an invariant reference in the document 406 is displayed in association with the location in the document 406 that corresponds to the invariant reference. In the example shown in FIG. 4, the invariant reference corresponds to the words "Simon Wheeler." Thus, this GUI 402 presents the comment 408 provided by a reader 114 together with the document 406 in a way that indicates the invariant reference with which the comment 408 is associated. The comment tools 410 provide the document owner 104 with one or more ways to interact with the comment 408. For example, the document owner 104 may ignore a comment 408 and by activating the "ignore" tool the document owner 104 can cause the GUI 402 to change so that the comment 408 is no longer displayed. Ignoring a comment 408 may cause the comment module 124 to modify the comment 408 as it is stored in its metadata 204 of the file 120 so that it is not displayed in other GUI renderings. Another comment tool 410 may be "mark for later" which flags the comment 408. A list of comments 408 that are flagged may be generated by the analytics module 310 for the document owner 104 to review separately from the other comments 408 that are not flagged. In some implementations, a reader 114 that created the comment 408 may be notified of "ignore" or "mark for later" choices.

Having the comment 408 displayed together with the document 406 in the same GUI makes it convenient for the document owner 104 to understand the context of the comment 408. This is in contrast to other systems that present comments separately from the document 102. Also, storing the comment 408 in the same file 120 as the document 406 serves to keep the comment 408 together with the document 406 so that they are not separated or disassociated as may occur with comments provided through a different channel or stored in a separate file.

The comment box 404, or other part of the GUI 402, may provide a way for the document owner 104 to communicate with the reader 114 who created the comment 408. One way to create communication from the document owner 104 to the reader 114 is for the document owner 104 to reply to the comment 408. The reply may be sent only to the reader 114 who generated the comment 408 or the reply may be sent to all readers 114 that are reviewing the document 406. In one implementation, the reply by the document owner 104 is added to a metadata 204 of the file 120 stored on the local memory of a document reading device 116 of the reader 114 who generated the comment 408. The reply may be associated with the comment 408 so that the reader 114 can view his or her comment 408 and the reply when the corresponding portion of the document 406 is displayed on the document reading device 116. The document owner 104 may also express sentiment about the comment 408 by indicating a type of sentiment such as positive, neutral, or negative. The sentiment may be indicated by a comment tool 410 in the comment box 404 or by another user interface element (e.g., like and dislike buttons). The response of the document owner 104 to a comment 408 may change the rating of a reader 114 and result in additional data or modification to existing data in a profile of the reader 114 such as a one of the user accounts 306. Positive sentiment and "mark for later" selections may increase the rating of a reader 114. Negative sentiment and "ignore" selections may decrease the rating of the reader 114. This rating is one factor a document owner 104 may consider when selecting readers 114 through the matching process.

Illustrative Processes

The processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 5:
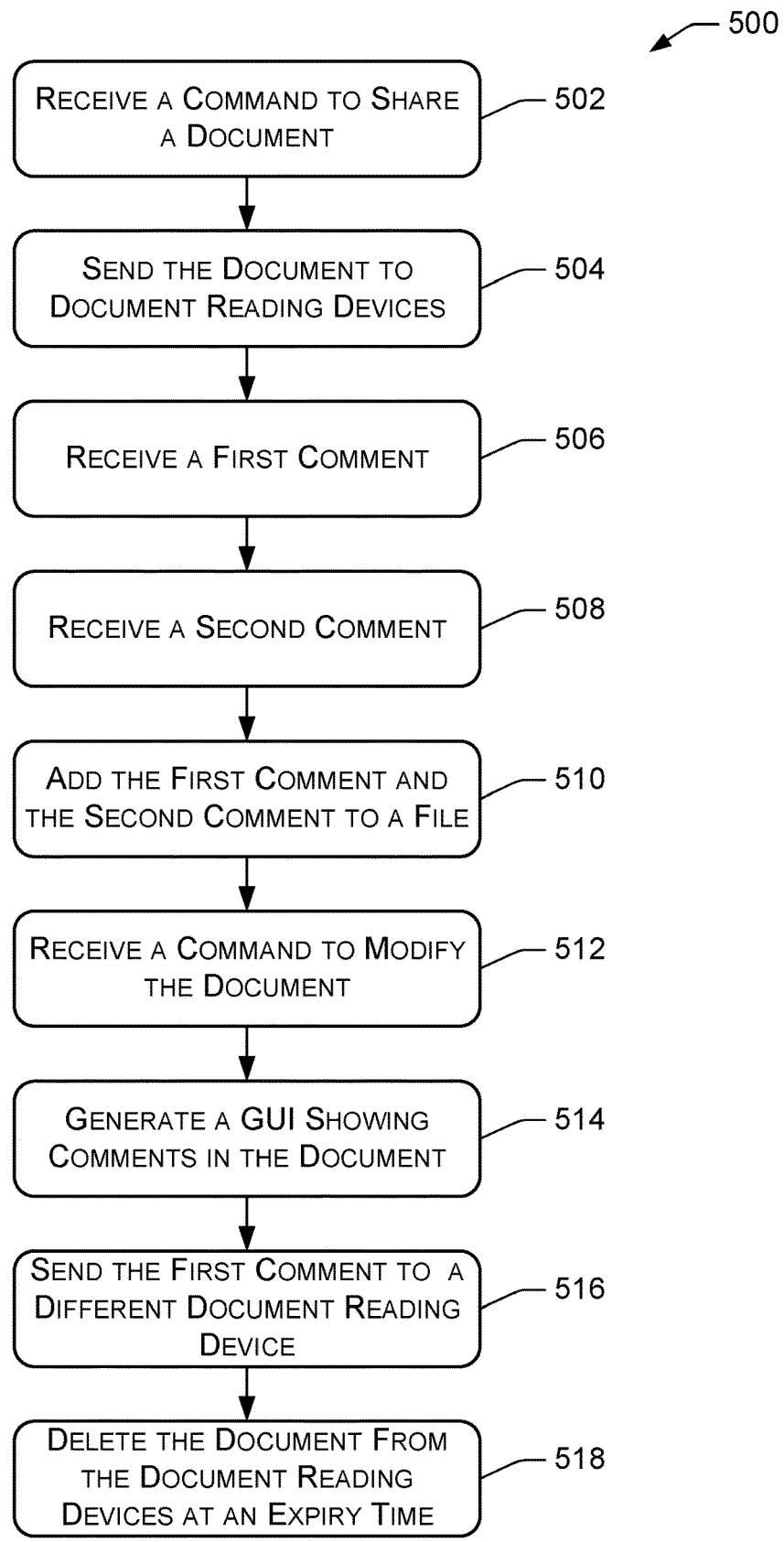
FIG. 5 is a flow diagram of an illustrative process to receive comments on a document.

FIG. 5 is a flow diagram of an illustrative process 500 to receive comments on a document 102. The process 500 is described with reference to the environment 100 and may be performed by the server 110 in cooperation with any one or more of the computing device 106 and/or the document reading devices 116(1), 116(2), . . . , 116(N). Of course, the process 500 may be performed in other similar and/or different architectures.

At 502, a command is received to share a document 102. The document 102 may be an e-book or any other type of electronic document. The command may be received by the server 110 from the computing device 106. Alternatively, the command may be received by a module on the computing device 106 in response to input generated by the owner of the document. The sharing may be initiated by owner of the document to provide a draft document 102 to one or more readers 114. Thus in an implementation, this comprises receiving a command from an owner of the document to share the document 102 with a first user account associated with a first document reading device (e.g., document reading device 116(1)) and with a second user account associated with a second document reading device (e.g., document reading device 116(1)). The owner of the document may be the document owner 104 or another individual with permission to manage the review of the document 102. Of course, the document 102 may be shared with any number of readers 114. One or more of the document reading devices 116(1), 116(2), . . . , 116(N) may be a dedicated, e-book reading device.

At 504, the document 102 is sent to one or more document reading devices 116(1), 116(2), . . . , 116(N). The document reading devices 116(1), 116(2), . . . , 116(N) may be configured to access documents in a proprietary file format (e.g., an e-book format) and the document 102 may be in that file format. Depending where the document 102 is stored, it may be sent from local memory of the computing device 106, computer-readable media 304 on the server 110, or another location. In an implementation, this may include sending document 102 to first document reading device (e.g., document reading device 116(1)) and to a second document reading device (e.g., document reading device 116(2)). The reading devices to which the document 102 is sent are the same reading devices indicated in the command to share the document 102 at 502. When the document 102 is sent, the original copy is still retained. Thus, a copy of the document 102 is created in each document reading device 116 designated to receive the document 102. As described above, the document 102 may be sent as part of a file that additionally includes the metadata containing comments and corrections.

At 506, a first comment on the document 102 is received from the first document reading device 116(1). The first comment may be received by the server 110 and processed by the comment module 124 after been sent from the first document reading device 116(1). The comment may be received without the accompanying document 102. The comment may be received with associated metadata such as an invariant location within the document 102. The comment may also be received as part of a file that includes the document 102 content. The first comment may be text generated on the first document reading device 116(1). For example, the first comment may be text such as shown in the comment 408 in FIG. 4. The first comment may also be audio, a picture, or video. The first comment may also include a first location reference indicating a first location in the document 102. Thus in an implementation, the first comment may comprise first text generated on the first document reading device 116(1) and a first location reference indicating a first location in the document 102 selected on the first document reading device 116(1) prior to entry of the first text. Thus, the first location reference, which may be an invariant location reference, represents a portion of the document 102 that was selected by a reader 114 using the first document reading device 116(1) prior to typing the text of the comment.

At 508, a second comment is received. Receiving a second comment may be similar to receiving the first comment as described at 506, but the second comment comes from a different source. For example, the second comment may come from the second document reading device 116(2) and comprise text generated on that second document reading device 116(2). Of course the second comment may be something other than text such as an audio file; and the first comment and the second comment may be different types of content such as a picture and a video for example. The second comment may include a second location reference indicating a second location the document 102 selected on the second document reading device 116(2) prior to entry of the second text. The selection of text to indicate the portion of the document 102 that is associated with a comment (e.g., the first comment or the second comment) may be an active selection such as performed by a user highlighting a portion of the document 102 displayed on a document reading device 116. Alternatively, the selection may be implied based on the portion of the document 102 displayed on the document reading device 116 when a comment is generated. For example, if two paragraphs of text are displayed on the document reading device 116 when a comment is generated on that document reading device 116, then the comment may be associated with both paragraphs of text. In another implementation, the comment may be associated with the entire portion of the document 102 that displayed on the document reading device 116 when the comment is generated.

At 510, data may be created in a file associated with the document 102. Creating the data may modify and existing file or result in the creation of a new file. The file may be file 120 as shown in FIG. 2. Thus, the data that is created may add the first comment and the second comment to the file. The file may also contain the document 102 in a separate portion of the file from the comments. In one implementation, comments from different document reading devices 116 are each placed in separate portions of the file. Thus, the file may be modified by adding the first comment to a first portion of the file and adding the second comment to a portion of the file. The file may include any number of discrete portions such that there are at least N different portions where N is the number of different document reading devices that have provided comments. The file structure of the file may be such that the first portion of the file and the second portion of the file are separate from each other and from the document 102.

At 512, a command is received from the document owner 104 to modify the document 102 based on the first comment. Thus, information contained in the metadata 204 portion of the file 120 is used to modify the document 102 stored in a different portion of the file 120. The modification may include, for example, adding the text of the comment to the text of the document 102. The text may be added to the document 102 at the location the document 102 with which the comment is associated. Thus, this modification may add at least a portion of the first text to the document 102 at the first location in the document 102. Similar modifications may be made based on the second comment and/or comments received from any other document reading device 116.

As well as incorporating the text of a comment into the document 102, the owner of a document may interact with a comment in a number of different ways. Some of these ways of interacting with a comment include closing the comment so that is no longer visible or deleting the comment so that it no longer exists in the metadata 204 portion of the file 120. Additionally, a command may be received from the owner of the document 102 to acknowledge the comment such as marking the comment as resolved. The above interactions, or any interactions with a comment, may be communicated to the document reading device 116 that generated the comment.

At 514, data from the file is generated to populate a GUI showing aggregated comments in the document 102. The GUI may include both the first comment and the second comment. If either of the comments is associated with a specific portion of the document 102, that comment may be shown in association with the corresponding part of the document 102. The GUI may be generated by the GUI generation module 316 on the server 110 by generating data for the GUI and sending that data to a different device that populates the GUI (e.g., the computing device 106). Thus, 514 may comprise generating data for a graphical user interface (GUI) indicating a representation of the document 102, presence of the first comment at the first location in the document 102, and presence of the second comment at the second location in the document 102.

If the first comment and the second comment are associated with portions of the document 102 that are far from each other, it may not be possible to display the document 102 in a conventional reading view and show both comments. Thus, a representation of the document 102 that can show more of the document 102 on a single GUI may be used with indicators representing where in the document 102 the first comment in the second comment are associated. As one example, the document 102 may be represented by a line broken into sections that correspond to chapters within the document 102. Each comment may be represented in this GUI by a mark near the corresponding portion of the document 102. In an implementation in which there are many comments from many readers 114 this type of GUI representation may function as a heat map showing which portion of the document 102 received the most comments. A heat map may be generated in part by the analytics module 310.

At 516, the first comment is sent to a different document reading device such as the second document reading device. This makes it possible for readers 114, and not just the document owner 104, to see comments that other readers 114 have provided for the document 102. If the comment includes a location identifier, then the first comment and the first location identifier may both be sent to the second document reading device 116(2) so that the first comment is displayed when the first location in the document 102 is displayed. Of course, the second comment may be sent to the first document reading device 116(1) in a similar manner. In an implementation, the comments of all readers 114 may be mutually shared so that each reader 114 can see his or her own comments as well as the comments of the other readers 114 that have access to the document 102.

Sharing comments with other readers 114 may be implemented by sending the comments to the document reading devices 116(1), 116(2), . . . , 116(N) and adding the comments to the metadata 204 of the files that are stored on the local memories of the respective document reading devices 116(1), 116(2), . . . , 116(N). Thus, in one implementation the document reading devices at 504 may receive a file that contains document 102 and an empty metadata 204 portion. A reader 114 using a document reading device 116 can add comments to the metadata 204 which will modify the file stored on the local memory of his or her device. These comments can be shared with the server 110 and/or the computing device 106 as described at 506 and 508. Then the server 110 (or computing device 106 depending on implementation) may send the comments back to one or more of the document reading devices 116(1), 116(2), . . . , 116(N).

At 518, the document 102 is deleted from the document reading devices 116(1), 116(2), . . . , 116(N) because time-limited access to the document has expired. Sharing of the document 102 may be limited both by which readers 114 are granted access to the document 102 and by the length of time for which readers 114 can access the document 102. For example, a command from the owner of the document to share the document 102 may include an expiry time and the document 102 is then deleted from the first document reading device 116(1) and the second document reading device 116(2) at the expiry time. The expiry time may be a specific date and time or it may be a certain period of time after the document 102 was first received by a given document reading device 116. As an alternative to deleting the document 102, it may be rendered unviewable on the first document reading device 116(1) and on the second document reading device 116(2) at the expiry time. For example, the document 102 may be encrypted so that it can no longer be accessed, but is not deleted from local memory of the document reading devices 116(1), 116(2), . . . , 116(N). This may be useful if, for example, the document owner 104 later decides he or she wishes to receive further comments from a reader 114 and then the document owner 104 can unencrypt or reactivate the document 102 on that reader's document reading device 116 without needing to again transmit the file containing the document 102 to the document reading device 116.

Figure 6:
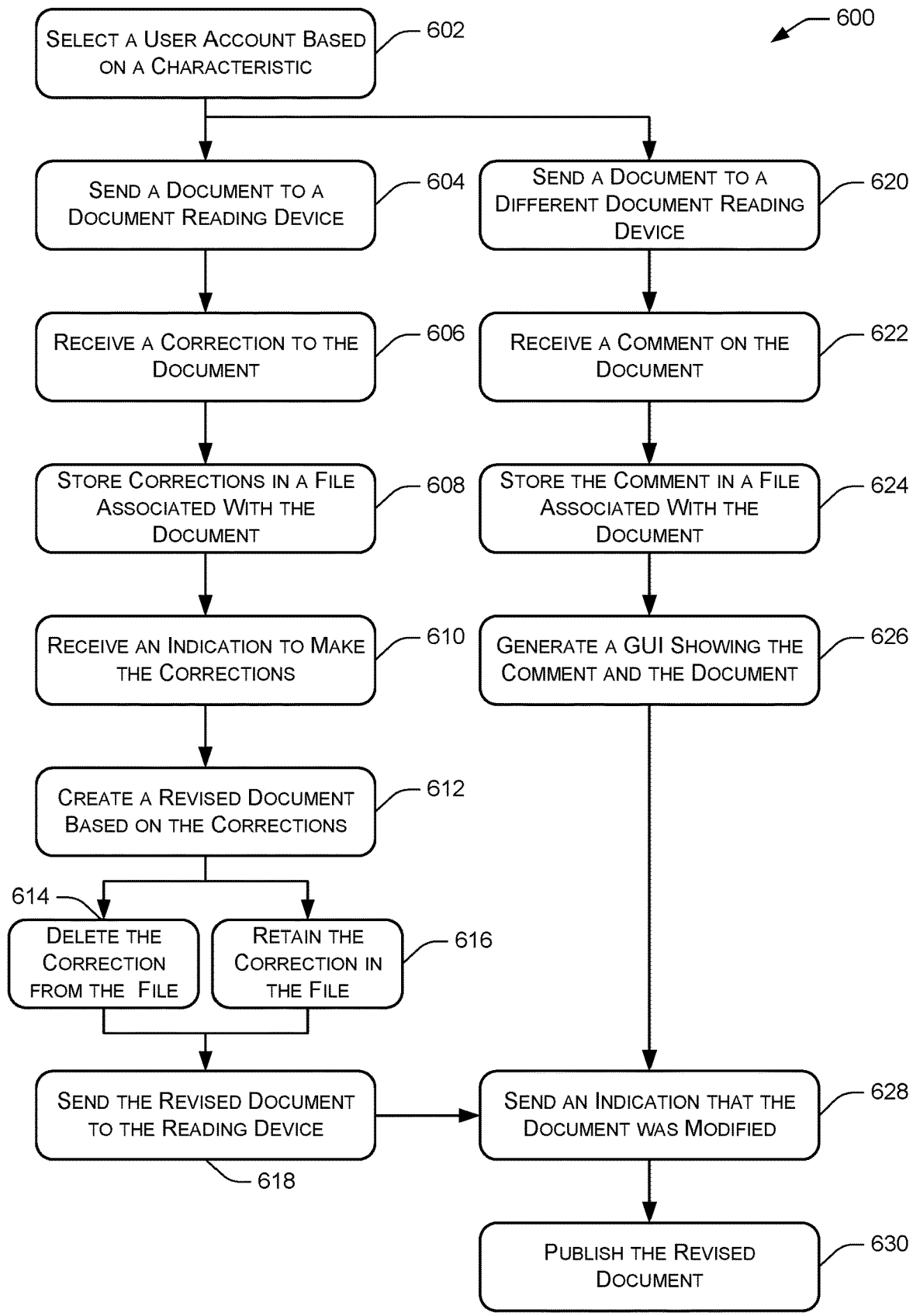
FIG. 6 is a flow diagram of an illustrative process to modify a document in response to a correction.

FIG. 6 is a flow diagram of an illustrative process 600 to modify a document 102 in response to a correction 206. The process 600 is described with reference to the environment 100 and may be performed by the server 110 in cooperation with any one or more of the computing device 106 and/or the document reading devices 116(1), 116(2), . . . , 116(N). Of course, the process 600 may be performed in other similar and/or different architectures.

At 602, a user account to receive a copy of the document 102 for review is selected based on at least one characteristic associated with that user account. The user account may be selected by an owner of the document. The user account may be one of the user accounts 306 shown in FIG. 3. This selection may be the result of a matching process. Thus, if the owner of the document 102 is looking for a reader 114 who is knowledgeable about French history, then the owner of the document 102 may search for user accounts that indicate knowledge of French history as a characteristic. Any characteristic that can be associated with a user account may be used to identify readers 114 for reviewing the document 102. Some example characteristics may include the user's interests, past reading patterns, qualifications, skills, education, profession, hobbies, etc.

At 604, a document 102 is sent to a first document reading device 116(1). Instructions are generated to send the document 102 to the first document reading device 116(1).

At 606, a first correction to the document 102 is received from the first document reading device 116(1) that received a copy of the document 102 at 602. The correction may be received by the correction module 312. The first correction may comprise at least one of a change to text in the document 102, a change to a font of a portion of the text in the document 102, a change to a style of a portion of the text in the document 102, or a layout of the document 102. The change to the text in the document 102 may include correcting a typographical error, correcting a spelling error, suggesting an alternative word choice, correcting grammar, modifying phrasing, etc. The change to the style of a portion of the text in the document 102 may include adding or removing bold font, underlining, italics, strikethrough, etc.

At 608, the first correction is stored in a file that is associated with the document 102. For example, the correction may be stored in a portion of the same file 120 that contains the document 102. The portion of the file 120 containing the correction may be different from the portion of the file containing the document 102. This portion of the file 120 storing the correction may also store a different correction from a different document reading device 116. Alternatively, the correction may be stored in a file that is associated with the document 102 but is separate from the file 120 containing the document. Thus, corrections from multiple different document reading devices 116 may be consolidated in a single file that may also contain the text of the document 102. Thus, although the correction may be stored in the same file as the document 102 or in a file associated with the file containing the document 102, the correction is not "made" to the document 102 in this operation.

At 610, an indication to make the corrections to the document 102 is received. The indication may be received from a computing device 106 associated with the document owner 104. In other words, this indication may comprise instructions to modify the document 102 based on the first correction and a second correction. The indication to make the corrections may be received and processed by the correction module 312.

At 612, a revised document is created based on the first correction and the second correction. In one implementation, the document 102 may be modified by the data thus implementing the first correction in the document 102. In another implementation, new data may be added to the document 102. This may be implemented by modifying a portion of the document 102 based on the corrections stored in the file. Modification of the document 102 may be controlled by the metadata access module 314.

At 614, the correction may be deleted from the file. After the correction is made to the document 102 there may no longer be a need to store the correction separately. Thus, the correction can be deleted.

At 616, however, in some implementations the correction may be retained in the file even though the document 102 has modified based on the correction. Retaining the correction in the file may provide a record of revisions.

At 618, the revised document 102 containing the first correction and the second correction may be sent to either or both of the first document reading device 116(1) and the second document reading device 116(2). Thus, the reader 114 that generated the correction in his or her document reading device 116 may see that correction reflected in the revised document 102. The revised document 102 may be sent to the document reading device 116 that was the source of the original correction by resending one or more files containing the revised document 102 and metadata 204. Upon receipt of this file, the document reading device 116 may replace the original file containing the earlier version of the document 102 or store the file containing the revised document 102 in addition to the first file. The revised document 102 may also be shared with any other document reading device 116 that received a copy of the original document 102.

Process 600 may also include a second path that runs, at least in part, parallel to the process steps described above. The document 102 may be reviewed by multiple different readers 114 at the same time each of the different readers 114 providing corrections and/or comments to the document 102. After sending the document 102 to a first document reading device (e.g., document reading device 116 (1)) at 604, the document 102 may also be sent to a third document reading device (e.g., document reading device 116 (N)) associated with a third user account selected by the owner of the document at 620. This third user account may be selected by the same criteria as the first user account.

At 622, a comment to the document 102 may be received from the third document reading device. Thus, a first document reading device 116(1) is providing a correction and a third document reading device 116(N) is providing a comment. The comment may include text associated with an invariant location in the document 102. For example, the comment may be similar to the comment 408 shown in FIG. 4.

At 624, the comment may be stored in the file. The comment may be stored in the same part of the file that stores the correction. In implementations in which the comment is stored in the same file as the document 102, the comment may be stored in a different part of the file than the document 102. Thus, the correction received at 606 and the comment received at 622 may both be stored in the same file that is linked to or the document 102 or is the same file containing the document 102. However, the correction and the comment may alternatively be stored in separate files from each other. For example, if stored in the same file as the document 102, there may be a first layer of metadata that contains corrections and a second, different layer of metadata in the file that contains comments. Alternatively, there may be first metadata associated with the first document reading device 116(1) that contains the correction and second metadata associated with the second document reading device 116(2) that contains the comment.

At 626, data for populating a GUI showing the comment and a portion of the document 102 identified by the invariant location is generated from the file. The GUI data may be generated by the GUI generation module 316 and sent to the computing device 106 where the GUI itself is rendered. Thus, with this GUI the document owner 104 may view the comment in the context of the document 102 as indicated by the invariant location.

At 628, indication that the document 102 was modified to make the correction to the document 102 or modified based on the comment may be sent to the first document reading device. This is different from 612 because sending the notification that the correction or comment was adopted by the owner of the document is different from sending a revised document back to the first document reading device 116. In some implementations, sending the revised document to the first document reading device 116 may be accompanied by notification that the document 102 was modified.

At 630, the revised document 102 is published. The revised document 102 may be published by the publication module 322. By publishing the revised document 102, the revised document 102 may be made available for download in a file formation that is not linked to the corrections and/or comments. Thus, the file containing the document 102 may be published alone without a link to another document. In one implementation, the published document may be available in the same file format as the file that was reviewed but the file that is actually distributed may have a different file structure that omits the portion(s) of the file containing the corrections and/or comments. Instead of omitting this portion of the file, the file may be published with data removed from this portion of the file. The published document will not include the comment received at 620. However, any modifications made to the document 102 based on the comment may be included in the version of the document 102 that is published.

Figure 7:
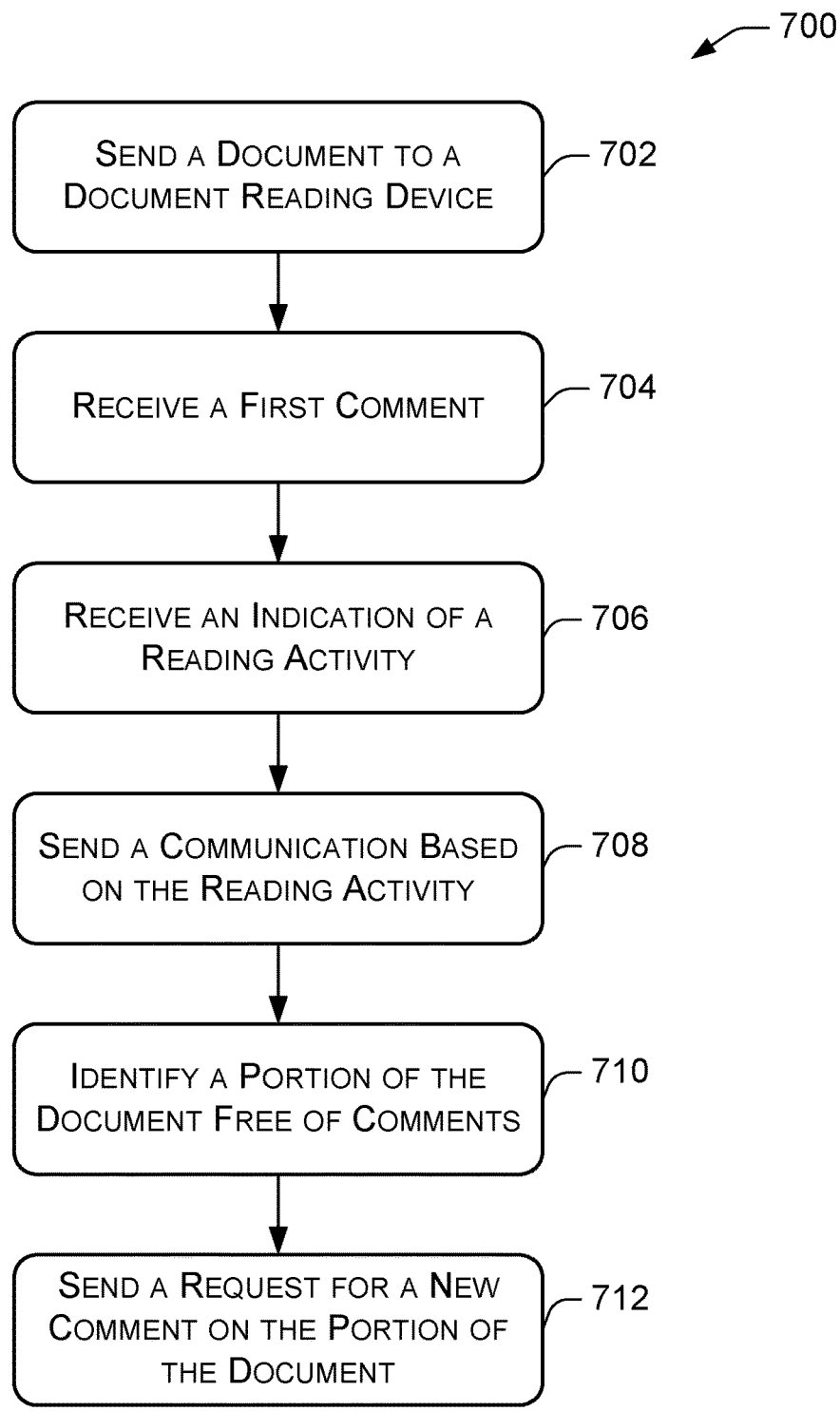
FIG. 7 is a flow diagram of an illustrative process to request comments based on reading activity.

FIG. 7 is a flow diagram of an illustrative process 700 to solicit feedback based on tracked reading activity. The process 700 is described with reference to the environment 100 and may be performed by the server 110 in cooperation with any one or more of the computing device 106 and/or the document reading devices 116(1), 116(2), . . . , 116(N). Of course, the process 700 may be performed in other similar and/or different architectures.

At 702, a file containing document 102 is sent to a document reading device 116. The file may be sent from a computing device 106 of a document owner 104 who created the document 102 or from a server 110 that is storing a copy of the document 102 for distribution. The document reading device 116 may store document 102 in local memory for access by a reader 114 interacting with the document reading device 116.

At 704, a first comment on the document 102 is received from the document reading device 116. The first comment may be associated with a file that comprises the document 102 or included in a metadata portion of the file that comprises the document 102. Receiving the first comment may be used to identify a reader that is at least providing at least minimal feedback rather than a reader that has received the document 102 but not provided any feedback.

At 706, an indication of reading activity associated with the document 102 on the document reading device 116 is received. Reading activity tracks the ways in which a reader 114 interacts with the document 102 while reading. Reading activity may include opening the document 102, turning a page of the document 102, viewing the same location in the document 102 multiple times ("re-reading" a page), creating a comment on the document 102, closing the document 102, or the like. As described above, the comment may be associated with an invariant location in the document 102. The indication of the reading activity may be received by the reading activity module 318.

Indications of various reading activities may be received multiple times as the document 102 is read on the document reading device 116. Each time the reader 114 engages in activities that counts as a reading activity, a corresponding indication may be generated and received. A list or record of the reading activities that a reader 114 engaged in with a document 102 may be stored in the reader activity log 320.

At 708, a communication based on the reading activity is sent to the document reading device 116 or to a user account associated with the document reading device 116. For example, an application running on the document reading device 116 may receive a message containing the communication. As an additional example, an email address associated with a user account that is also associated with the document reading device 116 may receive an email message containing the communication.

In one implementation, the reading activity indicated at 706 may be turning a page and the communication sent at 708 may be a request to create a comment. Thus, when a page turn command is received, a communication asking the reader 114 to provide a comment may be generated. A trigger for generating the communication may be a number page turns since a previous comment. For example, if the reader 114 has turned a page 10 times without making a comment, then a request to create a comment may be generated. A request to create a comment may also be generated in response to the reader 114 reaching a milestone within the document 102. Illustrative milestones may include the end of a chapter, the end of a section, progress through a predetermined percentage of the document 102, and the like.

In one implementation, the reading activity indicated at 706 may be turning a page and the communication sent at 708 may be a question for a reader 114 using the document reading device 116. The question may be a pre-generated question such as: Did you like what you just read? Did you find the previous part of this document 102 interesting? Is this document 102 difficult to understand? The communication, the specific question, is based on a change in reading speed derived at least in part from a timing of the turning the page. For example, indications of two or more page turns and the timing of receiving those indications may be used to calculate a speed at which the reader 114 is turning pages on the document reading device 116. If the reading speed changes by increasing or decreasing more than a threshold amount (e.g. more than 10% change, more than 25% change, more than 50% change) then a question may be selected and sent to the document reading device 116. For example, if the reading speed decreases by more than 25% then a question may be sent asking the reader 114 if he or she is having difficulty understanding the document 102.

In one implementation, the reading activity indicated at 706 may be viewing the same location in a document multiple times (i.e., re-reading a page) and the communication sent at 708 may be a request to create a comment. Re-reading of a page may be detected by a document reading device 116 displaying the same location in a document multiple times. Thus, if a reader 114 views a first page on the document reading device 116 then views at least one other page and once again views the first page, that can be interpreted as re-reading the first page. The request to create a comment may ask the reader 114 to comment on the location in the document that was displayed multiple times.

In one implementation, the reading activity indicated at 706 may be creating a comment associated with an invariant location in the document 102 and the communication sent at 708 may be a request to create another comment associated with another location in the document 102. Thus, after the reader 114 uses the document reading device 116 to create a comment on the document 102, the reader 114 may receive a communication on the document reading device 116, or other device, asking the reader 114 to create a comment for a different part of the document 102. The different part of the document 102 may be associated with a specific different, invariant location. In one implementation, the different part of the document 102 may be a part of the document that has relatively fewer comments than other parts of the document 102.

In one implementation, the reading activity indicated at 706 may be creating a comment associated with an invariant location in the document 102 when there is already another comment associated with the same invariant location. Multiple comments associated with the same location in the document may provide a strong indication that there is an issue with that part of the document deserving of attention. The communication sent at 708 may be a notification that multiple comments are associated with the invariant location in the document.

At 710, a portion of the document 102 that is free of comments may be identified. For example, comments provided from multiple different document reading devices 116(1), 116(2), . . . , 116(N) may be considered together and a portion of the document 102 such as a page, chapter, section, etc. that lacks comments may be identified. Identification of the portion the document 102 that is free of comments may be performed by the analytics module 310. In alternative implementations, a portion of the document 102 that has fewer than a threshold number of comments may be identified. The threshold number of comments may be a fixed integer such as 1, 5, etc. or a value derived from the number of comments in other portions of the document 102. Thus, the threshold number could be based on an average or median number of comments in other sections of the document 102. The threshold number could be the average or median number itself or a different value derived from the average or median such as 50% of the average or two standard deviations from the average.

At 712, a request or a new comment is sent to the document reading device 116 or to a user account associated with the document reading device. This request may be generated by the comment module 124. The request may solicit additional comments for the portion of the document 102 that is free of comments or alternatively that has less than the threshold number of comments. The request may appear as a pop-up or message on the document reading device 116 on which a reader 114 is reading the document 102. For example, the request may inform the reader 114 that there are no comments on chapter 7 and ask the reader 114 to provide a comment on that chapter.

CONCLUSION

The terms "a," "an," "the" and similar referents used in the context of describing the invention (especially in the context of the following claims) are to be construed to cover both the singular and the plural, unless otherwise indicated herein or clearly contradicted by context. The term "based on" is to be construed to cover both exclusive and nonexclusive relationships. For example, "A is based on B" means that A is based at least in part on B and may be based wholly on B.

All methods described herein can be performed in any suitable order unless otherwise indicated herein or otherwise clearly contradicted by context. The use of all examples and exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method for collaborative, distributed document editing comprising:
    sending a document, to a first document reading device and to a second document reading device that both access electronic documents, in a proprietary file format;
    receiving, by a server, a first comment on the document from the first document reading device, the first comment comprising first text generated on the first document reading device and a first location reference indicating a first location in the document selected on the first document reading device prior to entry of the first text;
    receiving, by the server, a second comment on the document from the second document reading device, the second comment comprising second text generated on the second document reading device and a second location reference indicating a second location in the document selected on the second document reading device prior to entry of the second text;
    creating, by the server, data in a file associated with the document by adding the first comment to the file and adding the second comment to the file, the document being in the proprietary file format;
    identifying a portion of the document that is free of comments; and
    sending a request to the first document reading device or the second document reading device for a new comment.

2. The computer-implemented method of claim 1, further comprising receiving a command from an owner of the document to share the document with a first user account associated with the first document reading device and with a second user account associated with the second document reading device.

3. The computer-implemented method of claim 2, wherein the command from the owner of the document to share the document includes an expiry time and further comprising deleting the document from the first document reading device and the second document reading device at the expiry time or rendering the document unviewable on the first document reading device and the second document reading device at the expiry time.

4. The computer-implemented method of claim 1, further comprising receiving a command from an owner of the document to modify the document based on the first comment and adding at least a portion of the first text to the document at the first location in the document.

5. The computer-implemented method of claim 1, further comprising generating data from the file to populate a graphical user interface (GUI) indicating a representation of the document, presence of the first comment at the first location in the document, and presence of the second comment at the second location in the document.

6. The computer-implemented method of claim 1, further comprising sending the first comment to the second document reading device and associating the first comment with the first location so that display of the first location in the document on the second document reading device also includes display of the first comment.

7. A computer-implemented method for document editing comprising:
 sending, by a server, a document to a first document reading device associated with a user account;
 receiving, by the server, a first correction to the document from the first document reading device, the first correction comprising at least one of a change to text in the document, a change to a font of a first portion of the text in the document, a change to a style of a second portion of the text in the document, or a change in layout of the document;
 storing the first correction in a file that is associated with the document;
 storing a second correction from a second document reading device in the file;
 receiving, by the server, an indication from a computing device to make the first correction and the second correction to the document;
 creating, by the server, a revised document based on the first correction and the second correction;
 identifying a third portion of the document or the revised document that is free of comments; and
 sending a request to the computing device, the first document reading device, or the second document reading device for a new comment.

8. The computer-implemented method of claim 7, wherein the user account is associated with at least one characteristic and further comprising selecting the user account based on the at least one characteristic.

9. The computer-implemented method of claim 7, further comprising deleting the first correction from the file in response to the creating the revised document.

10. The computer-implemented method of claim 7, further comprising sending the revised document containing the first correction and the second correction to the first document reading device.

11. The computer-implemented method of claim 7, further comprising:
 sending the document to a third document reading device associated with a third user account;
 receiving a comment on the document from the third document reading device, the comment comprising text associated with an invariant location in the document;
 storing the comment in the file; and
 generating data from the file to populate a graphical user interface (GUI) showing the comment and a fourth portion of the document identified by the invariant location in the document.

12. The computer-implemented method of claim 7, further comprising sending, to the first document reading device, another indication that a revised document was created.

13. The computer-implemented method of claim 7, further comprising publishing the revised document by making the revised document available for download in a file format that is not linked to the first correction or the second correction.

14. The computer-implemented method of claim 7, further comprising receiving an indication of a reading activity, associated with the document, from at least one of the first document reading device or the second document reading device, the reading activity including at least one of turning a page, viewing a same location in the document multiple times, or creating a comment associated with an invariant location in the document.

15. A computer-implemented method for soliciting feedback based on tracked reading activity:
 sending a file containing a document to a document reading device;
 receiving a first comment on the document from the document reading device;
 receiving an indication of a reading activity, associated with the document, from the document reading device; and
 sending a communication to the document reading device or to a user account associated with the document reading device, the communication based on the reading activity, wherein at least one of:
  the reading activity is creating a second comment associated with an invariant location in the document and a third comment that is also associated with the invariant location in the document, and wherein the communication is a notification that multiple comments are associated with the invariant location in the document; or
  the reading activity is turning a page, the communication is a request to create the second comment, and the communication is based on a number of page turns since the first comment.

16. The computer-implemented method of claim 15, wherein the reading activity further comprises turning a page, the communication is a question for a reader using the document reading device, and the communication is based on a change in reading speed derived at least in part from a timing of the turning the page.

17. The computer-implemented method of claim 15, wherein the reading activity is viewing the same location in the document multiple times and the communication is a request to create the second comment.

18. The computer-implemented method of claim 15, wherein the indication of the reading activity is received multiple times as the document is read on the document reading device.

19. The computer-implemented method of claim 15, further comprising identifying a portion of the document that is free of comments and sending a request to the document reading device or to the user account associated with the document reading device for a new comment.

20. The computer-implemented method of claim 15, wherein the reading activity is viewing a same location in the document multiple times.

\* \* \* \* \*